Dec. 2, 1924.

L. N. CRICHTON 1,517,280

RELAY SYSTEM

Filed Sept. 8, 1921

INVENTOR
Leslie N. Crichton.
BY
ATTORNEY

Patented Dec. 2, 1924.

1,517,280

UNITED STATES PATENT OFFICE.

LESLIE N. CRICHTON, OF EDGEWOOD, PENNSYLVANIA, ASSIGNOR TO WESTINGHOUSE ELECTRIC & MANUFACTURING COMPANY, A CORPORATION OF PENNSYLVANIA.

RELAY SYSTEM.

Application filed September 8, 1921. Serial No. 499,138.

*To all whom it may concern:*

Be it known that I, LESLIE N. CRICHTON, a citizen of the United States, and a resident of Edgewood, in the county of Allegheny and State of Pennsylvania, have invented a new and useful Improvement in Relay Systems, of which the following is a specification.

My invention relates to relay systems and particularly to direct-trip systems.

One object of my invention is to provide a direct-trip system in which energy for tripping an interrupter may be derived from the circuit to which the circuit interrupter is connected.

Another object of my invention is to provide a system, of the above-indicated character, in which the actuation of the interrupter is controlled in accordance with the temperature conditions in the apparatus connected to the circuit.

A further object of my invention is to provide a system, of the above-indicated character, in which the inductive character of the trip coil is utilized to provide an auto-transformer to effect heating a thermal controlling device in the control circuit.

United States patent application Serial No. 493,278, filed Aug. 18, 1921, by R. T. Pierce, and assigned to the Westinghouse Electric and Manufacturing Company, discloses a thermally-controlled direct-trip system comprising a current transformer in the circuit to be controlled, a trip coil connected thereto and a thermal-controlling device that normally short-circuits the trip coil and is energized from the current transformer in accordance with the temperature of a predetermined portion of the circuit. When the temperature of the predetermined portion of the circuit attains or exceeds a predetermined value, the thermal controlling device opens the short-circuit connection across the trip coil to permit the trip coil to be energized from the current transformer to open the circuit.

In practicing my invention, I employ the above-mentioned system and connect the thermal-controlling device to normally short-circuit a predetermined portion of the trip coil. Since the trip coil is of an inductive character, an auto-transformer action is effected, whereby the thermal-controlling device is traversed by current from the trip coil in addition to current from the current transformer, and a correspondingly greater heating effect is produced. By providing a plurality of taps on the trip coil, any desired degree of heating in the thermal-controlling device may be effected.

Figure 1:
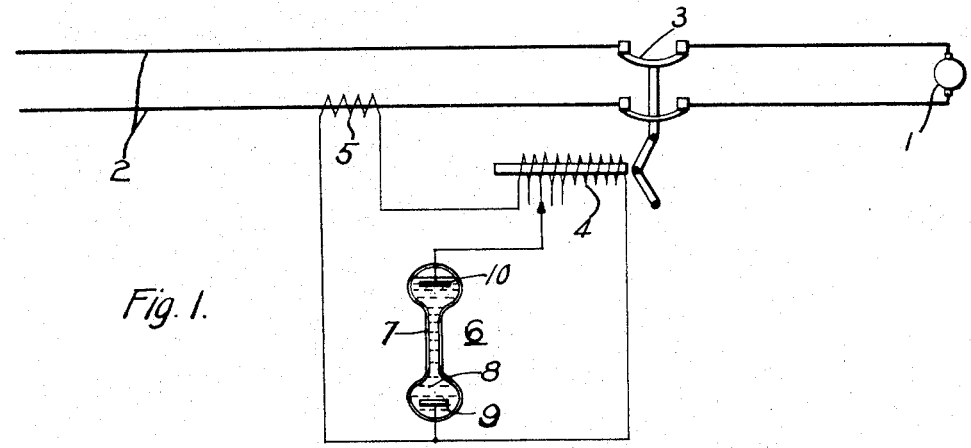
Figure 2:
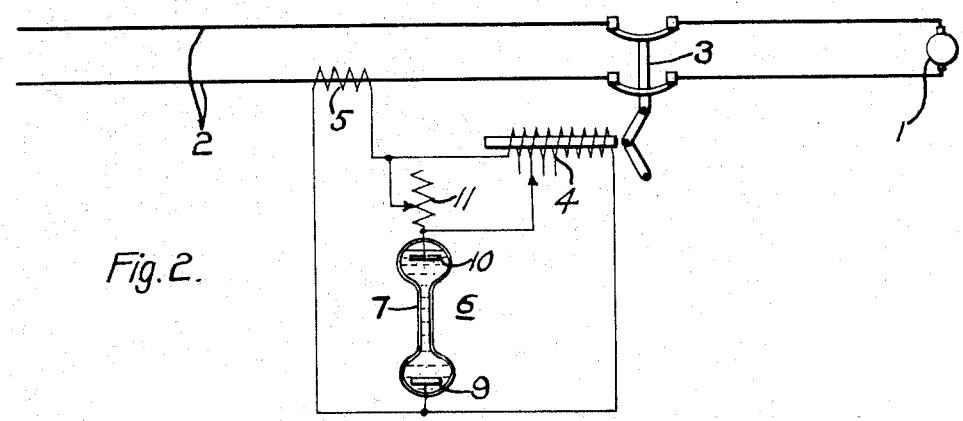
Figure 3:
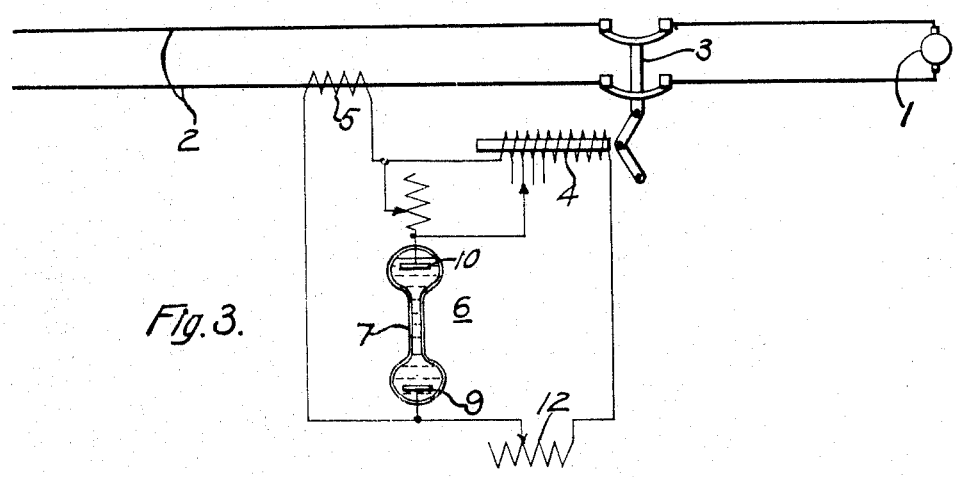

Figures 1, 2 and 3 of the accompanying drawings are diagrammatic views of electrical circuits illustrating a plurality of modifications of a control circuit embodying my invention.

In Fig. 1, a motor 1 receives energy from a source 2 of electromotive force through a circuit interrupter 3. The actuation of the interrupter 3 is effected upon the energization of a trip coil 4 that is energized from a current transformer 5. The energization of the trip coil 4 from the transformer 5 is controlled by a thermal relay 6 in accordance with predetermined temperature conditions in the motor 1.

The relay 6 comprises a tubular container 7 of non-conducting material, such as glass, a column of mercury 8 disposed therein and two terminals 9 and 10 whereby the column of mercury may be connected in an electric circuit.

The thermal relay 6 is designed to have a temperature characteristic that follows closely the temperature characteristic of the motor 1. The relay 6 is connected to normally short-circuit a predetermined portion of the trip coil 4. The trip coil 4 is provided with a plurality of taps whereby the relay 6 may be connected across any portion of the coil, as may be required.

While the temperature conditions within the motor 1 are normal, or less than a predetermined dangerous value, the thermal relay 6 is traversed by current from the current transformer 5 and is heated in accordance therewith. The circuit that includes the transformer 5 and the relay 6 also includes a few turns of the trip coil 4. Because of the inductive character of the trip coil 4, it acts as an auto-transformer, and the short-circuited portion operates as the secondary winding thereof to cause current to traverse the relay 6.

The relay 6 is thus traversed by current from both the current transformer 5 and the trip coil 4. Flexibility in adjustment of the current that shall operate the relay 6 is thus provided.

In Fig. 2, a variable resistor 11 is disposed in shunt relation to the few turns of the trip coil that are energized under normal conditions, and, with such a circuit, a still greater degree of flexibility in adjustment is obtained.

In the circuit that is illustrated in Fig. 3, a resistor 12 is disposed in circuit with the trip coil 4 and the relay 6 to control the current that is caused to traverse the relay 6 by the auto-transformer connection of the trip coil.

When the current traversing the circuit 2 and the motor 1 causes the temperature within the motor to attain a predetermined dangerous value, the column of mecury within the relay 6 becomes correspondingly heated to such degree that the continuity of the column is broken, and the short-circuit connection across a portion of the trip coil is removed. All of the current that traverses the current transformer 5 is then available to energize the trip coil 4, and the interrupter is actuated to disconnect the motor 1 from the circuit 2. By reason of the temperature correspondence of the mercury relay 6 and the motor 1, the column of mercury within the relay will not separate until a predetermined dangerous temperature is attained in the motor and, consequently, in the relay.

By means of arrangements such as are illustrated, additional heating may be provided for the thermal-controlling element of a direct-trip system with the advantages of flexibility in adjustment.

Because of the non-inductive character of the column of mercury in the relay 6, there is but little tendency for a large or suddenly increasing current to so divide that sufficient current may traverse the trip coil 4 to actuate the interrupter 3.

My invention is not limited to the specific types of elements that are illustrated or to the particular arrangement and disposition thereof, since modifications may be made therein within the spirit and scope of the invention, as set forth in the appended claims.

I claim as my invention:

1. In a direct-trip system for a circuit interrupter, the combination with a current transformer, an inductive trip coil connected thereacross and a non-inductive thermal relay normally connected across the terminals of the trip coil to short-circuit the same, of means whereby the normal heating of the thermal relay may be augmented by current from the trip coil.

2. A thermally-controlled direct-trip system comprising a trip coil, a current transformer for energizing the trip coil, a thermal relay for short-circuiting the trip coil to prevent operating energization thereof until a predetermined temperature is attained in the relay and means whereby an auto-transformer action is effected in the trip coil to cause additional current to traverse the thermal relay.

3. A direct-trip system for an electric circuit comprising a trip coil adapted to be energized in accordance with the current traversing the circuit, means normally short-circuiting a portion of the trip coil, said means being energized from the circuit in accordance with the temperature of a portion of the circuit and being adapted to open the short-circuit across the trip coil when heated to a predetermined degree, the auto-transformer action of the short-circuited portion of the trip coil serving to augment the heating of the temperature-energized means.

4. A direct-trip system comprising a source of energy, a trip coil adapted to be energized therefrom and a thermal-responsive means normally short-circuiting a portion of the trip coil.

5. A direct-trip system comprising a source of energy, an inductively wound trip coil adapted to be energized therefrom and means connected to the source of energy and the trip coil to be energized from the source of energy and from the trip coil by reason of the auto-transformer action of the inductively wound coil.

6. The method of providing additional heating to a thermal relay in a direct-trip circuit, which consists in utilizing its inductive character to operate it as an auto-transformer for the relay.

7. The combination with an electric circuit, of a thermal relay and a trip coil connected thereto to produce an auto-transformer effect for heating the thermal relay.

In testimony whereof, I have hereunto subscribed my name this 31st day of August 1921.

LESLIE N. CRICHTON.